(12) United States Patent
Evoniuk et al.

(10) Patent No.: US 7,973,241 B2
(45) Date of Patent: Jul. 5, 2011

(54) PRESSURE RESTRAINING ENCLOSURE FOR CABLES

(75) Inventors: Christopher J. Evoniuk, Austin, TX (US); William L. Taylor, Round Rock, TX (US); Pradip K. Bandyopadhyay, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 682 days.

(21) Appl. No.: 11/852,522

(22) Filed: Sep. 10, 2007

(65) Prior Publication Data

US 2009/0065237 A1   Mar. 12, 2009

(51) Int. Cl.
H01R 4/00 (2006.01)
(52) U.S. Cl. ...................................... 174/84 R
(58) Field of Classification Search ............ 174/74 R, 174/84 R, 85, 71 R, 73.1, 88 C, 88 R
See application file for complete search history.

(56) References Cited

U.S. PATENT DOCUMENTS

| | | | | |
|---|---|---|---|---|
| 2,195,933 | A | * | 4/1940 | Marlborough et al. ..... 174/21 R |
| 2,714,715 | A | * | 8/1955 | Manier ......................... 340/624 |
| 3,515,798 | A | | 6/1970 | Sievert |
| 4,110,550 | A | | 8/1978 | De Pietro |
| 4,188,352 | A | | 2/1980 | Suzuki et al. |
| 4,589,939 | A | * | 5/1986 | Mohebban et al. ............. 156/49 |
| 4,645,801 | A | | 2/1987 | Barnhouse |
| 4,942,906 | A | | 7/1990 | Igarashi et al. |
| 5,059,648 | A | | 10/1991 | Fukushima et al. |
| 5,374,784 | A | * | 12/1994 | Wentzel ........................ 174/73.1 |
| 5,408,047 | A | * | 4/1995 | Wentzel ........................ 174/73.1 |
| 5,714,715 | A | | 2/1998 | Sundhararajan et al. |
| 5,804,630 | A | | 9/1998 | Heyer et al. |
| 6,015,629 | A | | 1/2000 | Heyer et al. |
| 6,111,200 | A | | 8/2000 | De Schrijver et al. |
| 6,114,452 | A | | 9/2000 | Schmiegel |
| 6,340,794 | B1 | * | 1/2002 | Wandmacher et al. ...... 174/73.1 |
| 6,838,512 | B2 | | 1/2005 | Eggers et al. |
| 7,396,499 | B2 | | 7/2008 | Frankel et al. |

(Continued)

FOREIGN PATENT DOCUMENTS

EP   1251000   10/2002

(Continued)

OTHER PUBLICATIONS

Albin, L. D.; Kosmala, J. L.; Stoskopf, A. H. "Fluoroelastomer—SR Blends Offer Compounders New Choices." *Rubber and Plastics News* 11(8) (Nov. 9, 1981): 28-30.

(Continued)

Primary Examiner — William H Mayo, III
(74) Attorney, Agent, or Firm — Melanie G. Gover

(57) ABSTRACT

A pressure restraining enclosure for cables can include, for example, a first cable including a conductor and an oil-containing layer surrounding the conductor, and a second cable having a conductor. A splice can connect the conductor of the first cable with the conductor of the second cable. A pressure restraining sleeve can overly the splice and the conductors of the first and second cables. Several fasteners can be applied to several locations on the pressure restraining sleeve to tighten the pressure restraining sleeve around the splice and portions of the first and second cable. Embodiments of the pressure restraining enclosure can be used in the form of a sleeve on a single core cable, or alternatively as a body and a separate sleeve on multiple core cables such as three-core cables.

23 Claims, 5 Drawing Sheets

U.S. PATENT DOCUMENTS

| | | | |
|---|---|---|---|
| 7,511,222 | B2 | 3/2009 | Taylor et al. |
| 7,635,813 | B2 * | 12/2009 | Taylor et al. .......... 174/74 R |
| 2001/0011599 | A1 | 8/2001 | deBuyst |
| 2002/0061953 | A1 | 5/2002 | Takita et al. |
| 2003/0080457 | A1 | 5/2003 | Corveleyn |
| 2004/0214932 | A1 | 10/2004 | Patel et al. |
| 2004/0249054 | A1 | 12/2004 | Eggers et al. |
| 2005/0215661 | A1 | 9/2005 | Vora |
| 2005/0277731 | A1 | 12/2005 | Fukuda et al. |
| 2007/0027236 | A1 | 2/2007 | Bandyopadhyay et al. |

FOREIGN PATENT DOCUMENTS

| | | |
|---|---|---|
| JP | 57126663 | 8/1982 |
| JP | 62084153 | 4/1987 |
| JP | 63081144 | 4/1988 |
| JP | 2028239 | 1/1990 |
| KR | 10-1998-0042906 | 8/1998 |
| SU | 01024480 | 6/1983 |

OTHER PUBLICATIONS

Nakamura, Y.; Mori, K.; Wada, K. "Adhesion of Fluoroelastomer to Nitrile or Epichlorohydrin Rubber During Cure." *International Polymer Science and Technology* 12(2) (1985): T49-55.

Nersasian, A. "Compatability of Fuel-Handling Rubbers with Gasoline/Alcohol Blends." *Elastomerics* 112(10) (1980): 26-30.

Standard: "Standard Test Methods for Vulcanized Rubber and Thermoplastic Elastomers—Tension1," ASTM, Designation: D 412—98a (Reapproved 2002)1, Jan. 2003, pp. 44-57.

Material Specification: SC-X15112B, General Dynamics Land System Division, "M1 Tank Program Material Specification for Insulation Sleeving, Boots and Transitions, Electrical, Heat Shrinkable," Feb. 19, 1991, 11 pages.

* cited by examiner

PRESSURE RESTRAINING ENCLOSURE FOR CABLES

BACKGROUND

Some constructions of electrical cables, particularly early constructions of cables intended for underground use, consist of a lead jacket surrounding one or more electrical conductors, with a layer of insulative, oil-impregnated paper placed between the lead jacket and the electrical conductors. Cables of this construction are commonly referred to as paper-insulated lead-covered cables ("PILC cables"). Although modern cables now have extruded dielectric (plastic) jackets with no fluid inside, there are still substantial amounts of PILC cables in use. When a PILC cable needs to be repaired, terminated, or spliced, a seal (or oil-stop) must be provided to contain fluid in the cable system, due to the deleterious effects caused by the egress of the oil or other dielectric fluid used. Oil in the cable system is often under pressure due to thermal expansion of the oil from energy dissipated by the energized cable, and the pressure often fluctuates as the internal temperature of the cable changes due to, for example, changing energy loads.

SUMMARY

The invention can include, for example, embodiments of a pressure restraining enclosure for cables. A first cable can include a conductor and an oil-containing layer surrounding the conductor. A second cable can include a conductor. A splice can connect the conductor of the first cable with the conductor of the second cable. A pressure restraining sleeve can overly the splice and the conductors of the first and second cables. Several fasteners can be applied to several locations on the pressure restraining sleeve to tighten the pressure restraining sleeve around the splice and portions of the first and second cable.

The invention can also include, for example, other embodiments of pressure restraining enclosures for cables. A cable can include a singular main cable branching out to form a series of first cables each having a conductor and an oil-containing layer surrounding the conductor. A series of second cables can each include a conductor. Several splices can be included, where each of the splices can connect a conductor of each cable from the series of first cables with a conductor of each cable from the series of second cables. An electrically insulative elastomeric boot can overly a portion of the main cable and a portion of the series of first cables. The elastomeric boot can include a glove-like body which has a singular opening at a first end of the glove-like body and several openings at a second end of the glove-like body, where the singular opening can receive the main cable, and where each of the openings can receive each cable of the series of first cables. A pressure restraining body can overly the main cable and the elastomeric boot. The pressure restraining body can have a singular opening at one end of the pressure restraining body and several openings at the other end of the pressure restraining body, where the singular opening can receive the main cable, and where each of the openings can receive each cable of the series of first cables. A plurality of pressure restraining sleeves can be included, where each pressure restraining sleeve can overly each splice and the conductor of each cable of the series of first cables and the conductor of each cable of the series of second cables. Several fasteners can be applied to several locations on the pressure restraining body and each of the pressure restraining sleeves to tighten the pressure restraining body around the elastomeric boot and to tighten each of the pressure restraining sleeves around each splice and portions of each cable of the series of first cables and series of second cables.

DETAILED DESCRIPTION

Figure 1:
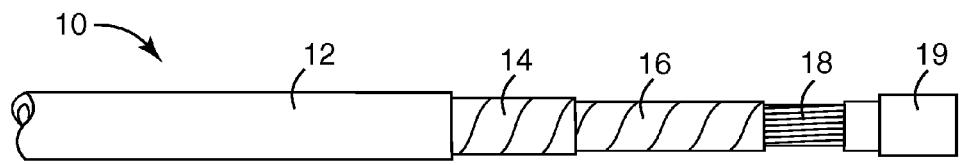
FIG. 1 is a side elevational view of the terminal end of a paper-insulated, lead-covered (PILC) electrical cable with portions of the various layers removed to expose the central conductor.

With reference now to the figures, and in particular with reference to FIG. 1, there is depicted an exemplary electrical cable 10 which contains a dielectric fluid therein. Cable 10 is representative of a paper-insulated lead-covered ("PILC") single conductor cable, and is constructed of an outer lead jacket 12, an intermediate semiconducting layer 14 formed of carbon-loaded paper or metalized paper, an oil-containing insulative layer 16 (formed of oil-impregnated paper in exemplary cable 10), and a central conductor or group of conductors 18. A semiconductive layer is present under insulative layer 16. Some cables 10 also have an outer plastic sheath surrounding and protecting the lead jacket 12.

For purposes of description, the present disclosure specifically describes the formation of a seal or oil-stop at an end of an oil-impregnated draining PILC cable to prevent leaking of fluid therefrom, thereby allowing a wide variety of accessories to be attached to the cable. It should be understood, however, that the teachings of this disclosure are equally applicable to cables having different constructions than the specific PILC cable construction described herein. For example, the teachings herein are applicable to mass-impregnated non-draining (MIND) cables that are impregnated with grease Similarly, the teachings of this disclosure are equally applicable to fluids other than oil, including high viscosity materials such as grease. Thus, as used herein, the term "PILC cable" is understood to encompass all types of cables having a fluid or viscous material therein, and the terms "oil" and "oil-stop" are understood to encompass all types of fluids or viscous materials used in cable constructions.

As shown in FIG. 1, cable 10 is prepared for installation of an oil-stop by first cutting off a section (e.g., 28 cm) of lead jacket 12, thereby exposing semiconducting layer 14. A slightly smaller section (e.g., 22 cm) of semiconducting layer 14 is similarly removed, exposing oil-containing insulative layer 16. Finally, an even smaller section (e.g., 11 cm) of oil-containing insulative layer 16 is removed, exposing central conductor 18. The semiconducting layer under insulative layer 16 is removed to substantially the same length as insulative layer 16. A cable transition connector 19 is installed on central conductor 18. Connector 19 may be any type of connector, including but not limited to connectors used for splicing or terminating cable 10.

Figure 2:
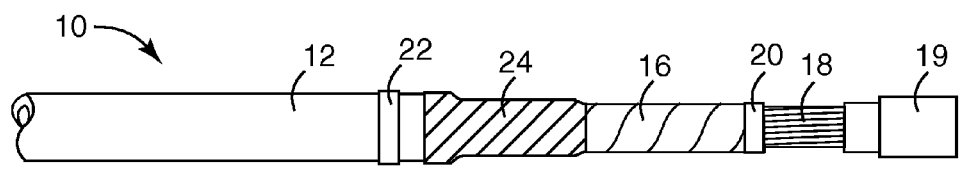
FIG. 2 is an elevational view similar to FIG. 1, wherein electrical stress-relief material has been applied to the end of the lead jacket and the intermediate semiconducting layer, and the paper insulation has been taped to prevent unraveling.

As shown in FIG. 2, in one implementation oil-containing insulative layer 16 is held in place by a strip of insulative adhesive tape 20, which keeps oil-containing insulative layer 16 from unraveling. A suitable tape for this purpose is sold by 3M Company, assignee of the present application, under the trade designation "33+ vinyl electrical tape." A second strip of tape 22 may be placed on lead jacket 12 near its cut edge (e.g., within 1-2 cm) to mark the location of the cut edge of lead jacket 12 as explained below. The same type of tape may be used for tape 22 as was used for tape 20.

As further preparation for the formation of an oil-stop according to one embodiment, cable 10 is provided with some form of dielectric stress relief. In one embodiment, this is accomplished by winding a high-dielectric constant tape 24 around the terminal portion of lead jacket 12 and semiconducting layer 14. Stress control tape 24 completely covers semiconducting layer 14 and slightly overlaps (e.g., 1 cm) oil-containing insulative layer 16. A suitable tape for this purpose is available from 3M Company under the trade designation "2220 stress control tape."

Figure 3:
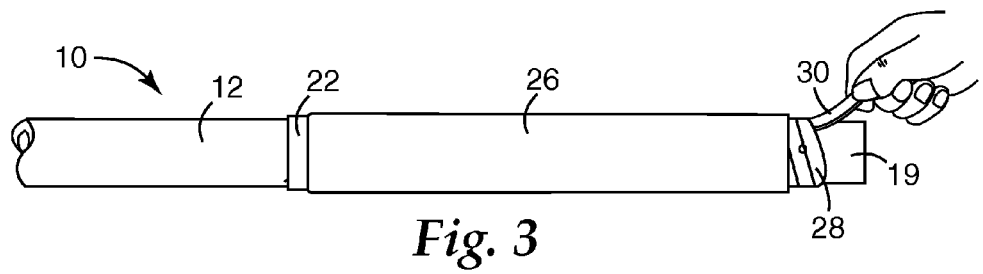
FIG. 3 is an elevational view similar to FIGS. 1 and 2, further illustrating application of the elastomeric tube which forms an oil-stop.

With reference now to FIG. 3, the first element of the oil-stop is an elastomeric tube 26. Elastomeric tube 26 is electrically insulative and substantially oil-impermeable, and as described in greater detail below, is formed of a composition comprising a fluoroelastomer and an epichlorohydrin. As used herein, the term "substantially oil-impermeable" encompasses both limited and absolutely impermeability to the particular fluid contained in the cable. Limited impermeability is defined by the maximum allowed percent weight increase as set forth in Military Spec, SC-X15111B (Sep. 27, 1984). Elastomeric tube 26 is typically fabricated by extrusion or molding and, in its relaxed state, is generally cylindrical. As used herein, the terms "tube," "tubular," "cylinder," "cylindrical," etc., are not limited to objects having a circular cross-section, but rather denote a hollow, elongated member of any cross-section. Elastomeric tube 26 can be either a single-layer element, or may be formed as a multiple-layered element with other elastomers to provide for combined mechanical support, or to make the system more economically attractive.

The size of elastomeric tube 26 may vary considerably, depending upon the size of cable 10. In one embodiment, the length of elastomeric tube 26 is equal to or greater than the length from lead jacket 12 to connector 19. The diameter of elastomeric tube 26 (in its relaxed state) is smaller than the diameter of insulative layer 16, typically one millimeter or larger. Due to the elastic properties of elastomeric tube 26, a single diameter tube may conveniently be used on cables 10 having a range of diameters. Of course, in the expanded state shown in FIG. 3, the diameter of elastomeric tube 26 is greater than the diameter of cable 10. The thickness of elastomeric tube 26 (in its relaxed state) may vary depending upon the intended application.

Prior to installation onto cable 10, elastomeric tube 26 is supported on a removable core 28 as is conventionally known, for example as described in U.S. Pat. No. 3,515,798 to Sievert. Removable core 28 maintains elastomeric tube 26 in a radially expanded state, and is also generally cylindrical and slightly longer than elastomeric tube 26. The diameter of removable core 28 may vary widely, the only practical requirement being that it is larger than the outer diameter of cable 10, and provides sufficient clearance for the core 28 to be removed. The wall of core 28 typically has a thickness in the range of one millimeter to five millimeters. Removable core 28 is constructed of any durable, flexible material, such as cellulose acetate butyrate, polypropylene, polyethylene or polyvinyl chloride. In one embodiment, removable core 28 is a helically coiled strip having adjacent coils joined in a separable manner, thereby allowing core 28 to be collapsed and removed from within tube 26 by firmly pulling and unwinding the end 30 of the strip.

Figure 4:
FIG. 4 is an elevational view further depicting the elastomeric tube of FIG. 3 in resilient conformity with the PILC cable.

As shown in FIG. 3, one end of elastomeric tube 26 is held adjacent marking tape 22. As end 30 of removable core 28 is pulled, elastomeric tube 26 slowly shrinks in place around cable 10, until it is in tight and resilient conformity with cable 10 as shown in FIG. 4. In the embodiment illustrated in FIG. 4, elastomeric tube 26 overlaps lead jacket 12 by about two centimeters (2 cm) and overlaps connector 19 by a similar distance. Elastomeric tube 26 thus provides an oil-stop that prevents the leaking of fluid from within cable 10 and also preventing the ingress of water into cable 10.

It should be noted that elastomeric tube 26 is in direct contact with oil-containing insulative layer 16, and is applying resilient pressure to oil-containing layer 16. As used herein, "resilient pressure" refers to the ability of the installed elastomeric member to expand and contract with changes in size of the underlying substrate and changes in pressure of the cable fluid due to, for example, thermal expansion and contraction. Beneficially, therefore, as elastomeric tube 26 cyclically and elastically expands and contracts, the deformation of elastomeric tube 26 provides pressure relief to the fluid in cable 10, and limits the pressure in cable 10.

Figure 5:
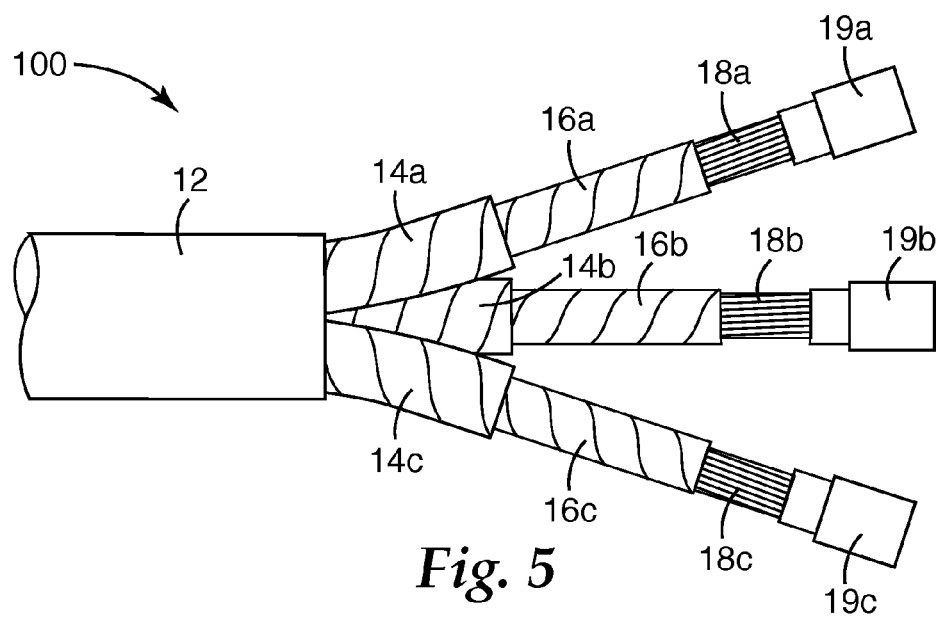
FIG. 5 is a side elevational view of the terminal end of a three-conductor PILC cable, with portions of the various layers removed to expose the three conductors.

As noted above, PILC cables may include more than one central conductor 18. With reference to FIG. 5, a cable 100 is representative of a PILC cable having a plurality of conductors 18. Cable 100 is illustrated as having three conductors 18a, 18b, 18c (collectively conductors 18), although other numbers of conductors are possible. Similar to cable 10 described above with reference to FIGS. 1-4, each conductor 18a, 18b, 18c of cable 100 is surrounded by a corresponding oil-containing insulative layer 16a, 16b, 16c, respectively, (collectively oil-containing insulative layers 16) formed of oil-impregnated paper in exemplary cable 100, which is in turn surrounded by a corresponding intermediate semiconducting layer 14a, 14b, 14c, respectively, (collectively semiconducting layers 14) formed of carbon-loaded paper or metalized paper. The group of conductors 18 (i.e., each conductor 18 with its corresponding insulative layer 16 and semiconducting layer 14) is surrounded by a single outer lead jacket 12 to form cable 100. Some cables 100 also have an outer plastic sheath surrounding and protecting the lead jacket 12.

As shown in FIG. 5, cable 100 is prepared for installation of an oil-stop by first cutting off a section of lead jacket 12, thereby exposing and allowing separation of the plurality of conductors 18 and associated semiconducting layers 14 and oil-containing layers 16. Each of the plurality of conductors 18 in cable 100 is prepared in a manner similar to that described above with respect to conductor 18 of cable 10 (FIG. 1). That is, a section of semiconducting layer 14 is removed to expose the underlying oil-containing insulative layer 16, and then a smaller section of oil-containing insulative layer 16 is removed to expose the underlying central conductor 18. Cable transition connectors 19a, 19b, 19c (collectively connectors 19) are then installed on central conductors 18. As noted above, connector 19 may be any type of connector, including but not limited to connectors used for splicing or terminating cable 10.

Figure 6:
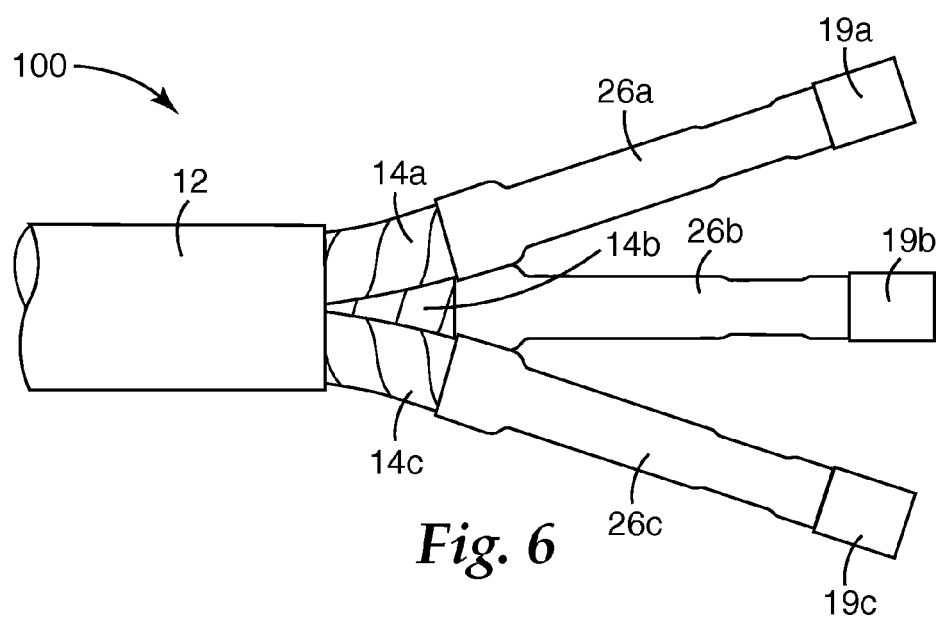
FIG. 6 is an elevational view similar to FIG. 5, further depicting elastomeric tubes in resilient conformity with each the conductors of the PILC cable.

As shown in FIG. 6, for each prepared conductor 18a, 18b, 18c, an elastomeric tube 26a, 26b, 26c, respectively, is installed in a manner similar to that described with reference to FIGS. 1-4 above, although the provision of dielectric stress relief, such as by winding a high-dielectric constant tape around the terminal portion of lead jacket 12 and semiconducting layer 14, may be omitted. As described above with respect to FIGS. 1-4, elastomeric tubes 26 are electrically insulative and substantially oil-impermeable, and as described in greater detail below, are formed of a composition comprising a fluoroelastomer and an epichlorohydrin. In one embodiment, the length of each elastomeric tube 26 is equal to or greater than the length from lead jacket 12 to connector 19. In the embodiment illustrated in FIG. 6, each elastomeric tube 26 overlaps connector 19 by about two centimeters (2 cm), but does not extend fully to lead jacket 12 due to the converging nature of conductors 18. In one embodiment, elastomeric tubes 26 are positioned as close to lead jacket 12 as is possible.

As shown in FIG. 6, after installation, each of elastomeric tubes 26 is in tight and resilient conformity with its corresponding conductor 18, oil-containing insulative layer 16, and semiconducting layer 14. Each elastomeric tube 26 is in direct contact with the underlying oil-containing insulative layer 16, and is applying resilient pressure to oil-containing layer 16.

Figure 7:
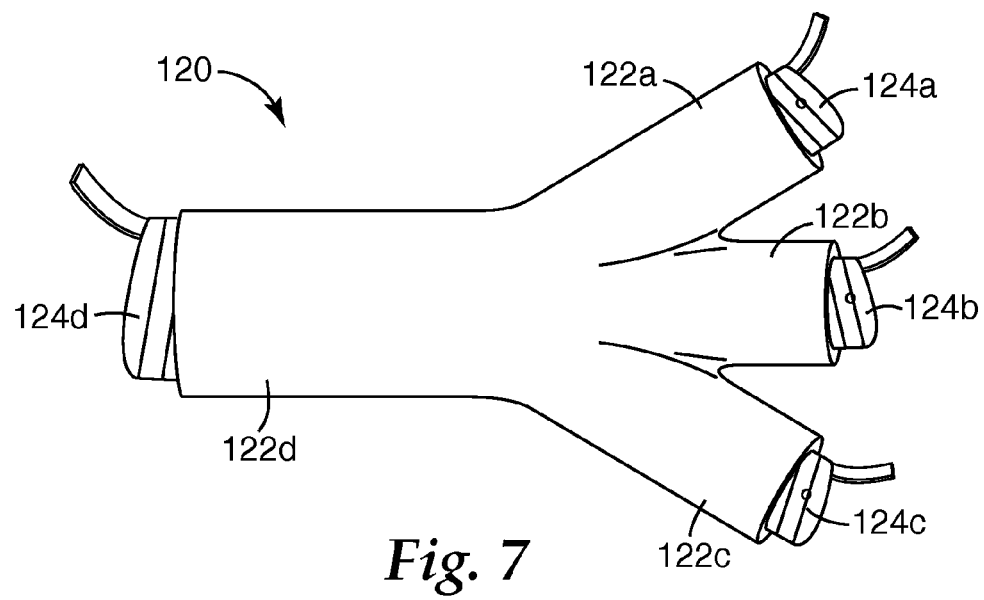
FIG. 7 is a perspective view of a branched cold-shrink article in an expanded state on a plurality of cores.
Figure 8:
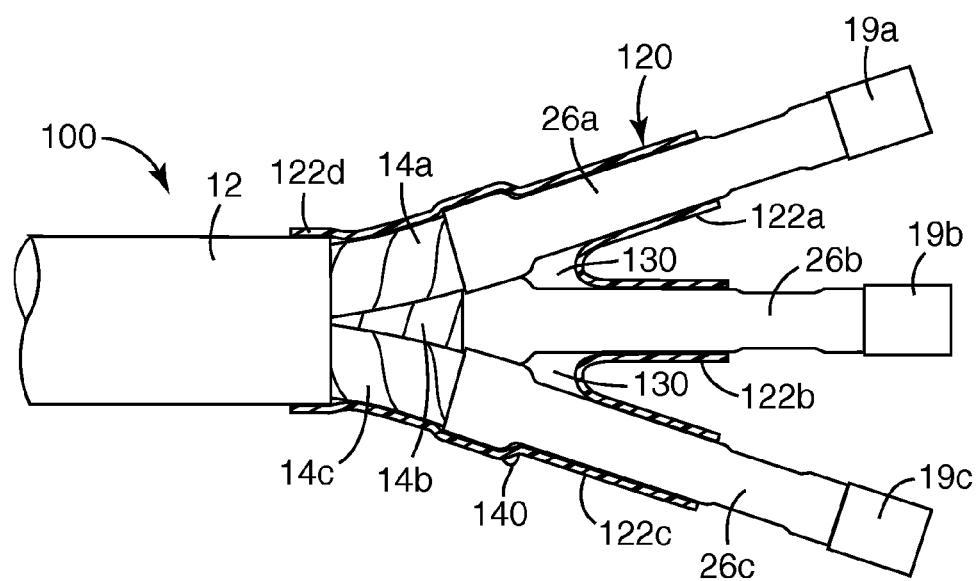
FIG. 8 is a partial sectional view showing the branched cold-shrink article of FIG. 7 installed on the PILC cable of FIG. 6.
Figure 9:
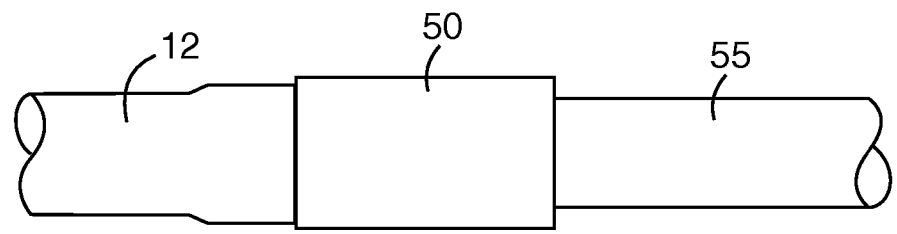
FIG. 9 is a sectional view of a single core cable including a splice connection.
Figure 10:
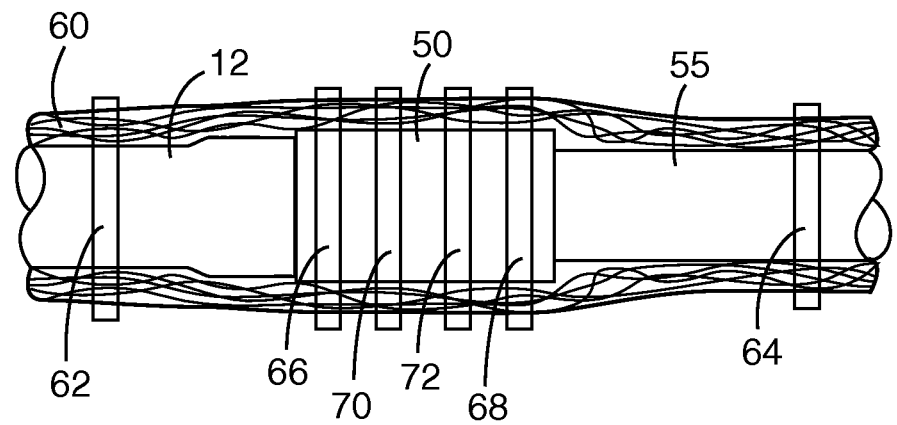
FIG. 10 is a sectional view of the single core cable of FIG. 9 used with a pressure restraining sleeve and fasteners on the pressure restraining sleeve.
Figure 11:
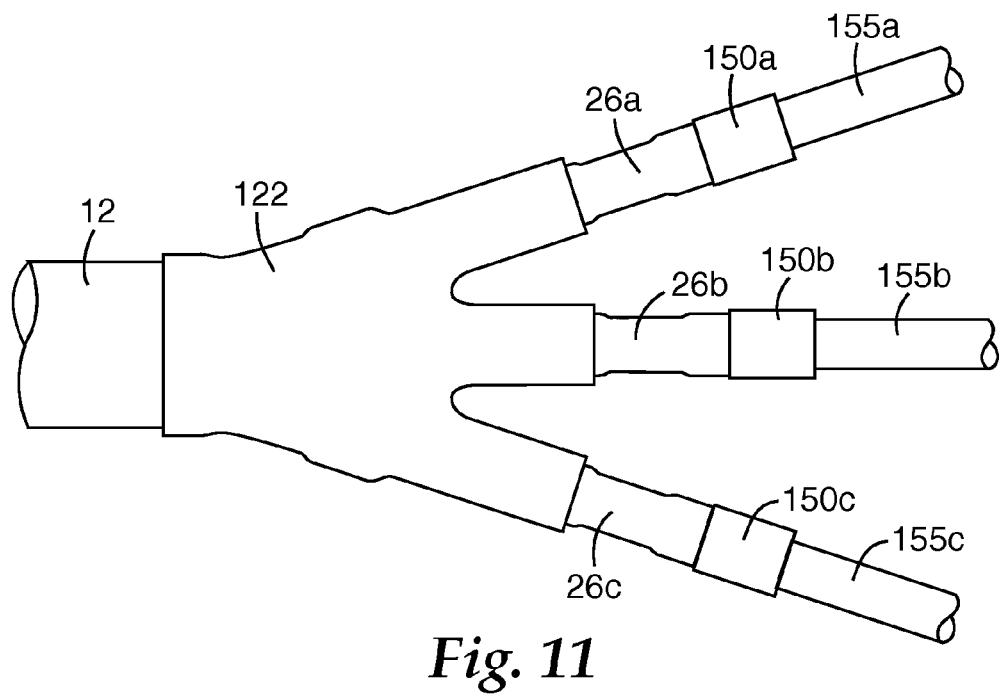
FIG. 11 is a sectional view of a three-conductor cable including several splice connections.
Figure 12:
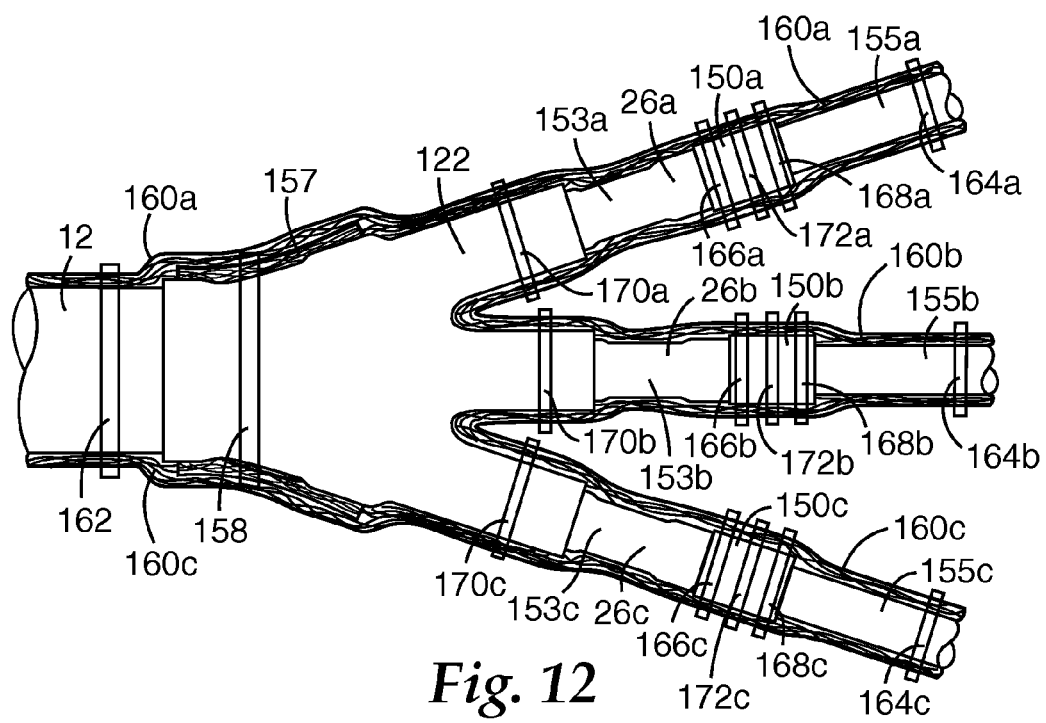
FIG. 12 is a sectional view of the three-conductor cable of FIG. 11 used with a pressure restraining body and a pressure restraining sleeve, and used with fasteners on both the pressure restraining body and the pressure restraining sleeve.

With reference to FIGS. 7 and 8, a second element of the oil-stop for cable 100 is illustrated. In particular, an exemplary elastomeric boot 120 is illustrated. Elastomeric boot 120 is a branched cold-shrink article having a plurality of hollow elastomeric portions (or members) 122a, 122b, 122C, and 122d that are in communication with each other. FIG. 7 shows hollow elastomeric portions 122a, 122b, 122c, and 122d in an expanded state on corresponding removable cores 124a, 124b, 124c, and 124d. In one embodiment, elastomeric boot 120 is electrically insulative. In one embodiment, elastomeric boot 120 is substantially oil-impermeable. In one embodiment, elastomeric boot 12 is formed of a composition comprising a fluoroelastomer and an epichlorohydrin. In one embodiment, elastomeric boot 120 and elastomeric tubes 26 are formed of substantially the same composition. In one embodiment, elastomeric boot 120 is semiconductive to aid in providing dielectric stress relief. Elastomeric boot 120 is typically fabricated by molding. As with elastomeric tube 26, elastomeric boot 120 can be either a single-layer element, or may be formed as a multiple-layered element with other elastomers to provide for combined mechanical support, or to make the system more economically attractive.

As seen in FIG. 7, elastomeric boot 120 is formed in the shape of a glove with a large opening (portion 122d) sized to receive the intact cable 100 and a number of smaller openings (portions 122a, 122b, and 122c) at the other end allowing the separated individual conductors 18 to exit elastomeric boot 120. The number of smaller openings corresponds to the number of conductors 18 in cable 100.

The elastomeric boot 120 (more particularly portions 122a, 122b, 122c, and 122d thereof) may be deployed onto cable 100 and the prepared conductors 18 pursuant to the methods described above in relation to deployment of elastomeric tubes 26. In particular, as removable cores 124a, 124b, 124c, and 124d are removed, the respective portions 122a, 122b, 122c, and 122d of elastomeric boot 120 shrink into place, until they are in tight and resilient conformity with cable 100 as shown in FIG. 8. As with elastomeric tube 26, the size of elastomeric boot 120 may vary considerably depending upon the size of the cable 100 and conductors 18 therein. Portions 122a, 122b, 122c, and 122d are sized in diameter to effectively seal against the corresponding outer surfaces of cable 100 and elastomeric tubes 26a, 26b, 26c when in their contracted state. In one embodiment, as illustrated in FIG. 8, the lengths of portions 122a, 122b, 122c, and 122d in their contracted state are sufficient to allow portion 122d to overlap lead jacket 12 of cable 100 by about two centimeters (2 cm), and the lengths of portions 122a, 122b, and 122c are sufficient to overlap the underlying elastomeric tube 26a, 26b, 26c by about 5 cm to 8 cm. Of course, other amounts of overlap by elastomeric boot 120 are possible and may be desired depending upon the intended application. Once elastomeric boot 120 is in place, the oil-stop is complete. This assembly creates a reliable seal and prevents the egress of any fluid from cable 100 while also preventing the ingress of water into cable 100.

In some applications, the presence of voids, or the possibility of voids, under elastomeric boot 120 (such as at the areas 130 between portions 122a, 122b, and 122c) may be avoided by providing elastomeric boot 120 with a nipple 140 (FIG. 8) for extracting air during or after installation of elastomeric boot 120.

It should be noted that elastomeric boot 120 is applying resilient pressure to the underlying elastomeric tubes 26, and also to the underlying oil-containing layers 16. That is, both elastomeric tubes 26 and elastomeric boot 120 expand and contract with changes in size of the underlying cable 100 and changes in pressure of the cable fluid due to, for example, thermal expansion and contraction. Beneficially, therefore, as elastomeric tubes 26 and elastomeric boot 120 cyclically and elastically expand and contract, pressure relief is provided to the fluid in cable 100, and the pressure of fluid in cable 100 is limited.

The oil-stops as described herein effectively convert the end of a PILC cable (either single core or multi-core) into a plastic cable. The PILC cable may then accommodate the use of various cable accessories which are normally limited to extruded dielectric cables. For example, a connector may be used to attach a termination lug to central conductor 18, or a separate splice assembly may be used to connect cable conductors 18 to other cable conductors (not shown). The other cable may be an extruded dielectric cable, or a PILC cable which also has an oil-stop according to the instant disclosure.

As referenced above, embodiments of the instant disclosure include cold-shrink articles formed from elastomeric compositions that incorporate at least a fluoroelastomer and an epichlorohydrin. Examples of suitable elastomeric compositions that incorporate at least a fluoroelastomer and an epichlorohydrin are described in detail in co-pending and commonly assigned United States patent application titled "Cold-Shrink Article and Method of Making Cold-Shrink Article," Ser. No. 11/191,838, filed Jul. 28, 2005, which is incorporated by reference herein in its entirety.

The term "epichlorohydrin", as used herein, refers to any substance containing epichlorohydrin, including any polymer containing epichlorohydrin monomers such as, for example, photopolymers, copolymer, terpolymers, and tetrapolymers that contain epichlorohydrin. The term "cold-shrink", as used herein, is defined as the capability of an article (or a portion of an article) to shrink from an expanded state toward a relaxed, or a partially expanded, state at room temperature conditions (e.g., about 20° C.-25° C.) and in the absence of heating.

Elastomers are included in the elastomeric compositions of cold-shrink articles to allow the cold-shrink articles to expand from a relaxed state to an expanded state, while also allowing the articles to cold-shrink back toward the relaxed state. A mixture of fluoroelastomer and epichlorohydrin is included in the elastomeric compositions of the present invention. Some embodiments of cold-shrink articles of the present invention may be exposed, in an expanded state, to temperatures of at least about 150° C. for an extended period of time without exhibiting, upon unaided visual inspection by a human eye, any splitting, tearing, or breakage.

Unless otherwise stated, all concentrations herein are expressed in parts by weight per hundred parts by weight rubber (phr), with the rubber defined to be the total weight of both fluoroelastomer and epichlorohydrin. Thus, as used herein, the phr of a particular component represents the parts by weight of the component relative to 100 total parts by weight of fluoroelastomer and epichlorohydrin.

A wide range of concentrations of epichlorohydrin and fluoroelastomer may be included in the elastomeric compositions of the present invention. For example, in some embodiments, the concentration of fluoroelastomer in the elastomeric compositions of the present invention may range from about 10 parts or greater by weight of fluoroelastomer to about 60 parts or less by weight of fluoroelastomer, per 100 total parts by weight of fluoroelastomer and epichlorohydrin, and the concentration of epichlorohydrin in the elastomeric compositions may range from about 40 parts or greater by weight of epichlorohydrin to about 90 parts or less by weight of epichlorohydrin, per 100 total parts by weight of fluoroelastomer and epichlorohydrin. As used herein, in the context of polymers containing epichlorohydrin (e.g., homopolymers, copolymers, terpolymers, and tetrapolymers that contain epichlorohydrin), parts by weight of epichlorohydrin refers to the total weight of the polymer containing the epichlorohydrin.

Reinforcing filler material may optionally be included in the elastomeric composition of the present invention to enhance the split and tear properties of cold-shrink articles (formed from the elastomeric composition) at elevated temperatures. Examples of suitable filler materials include silica-based reinforcement filler, reinforcement-grade carbon black, fluoroplastics, clays, and any combination of any of these in any proportions. Examples of suitable fillers are described in detail in the above-noted U.S. patent application Ser. No. 11/191,838. As used therein, the term "silica-based reinforcement filler" is defined to include all compounds of the formula $SiO_2$ (e.g., pure silica); all compositions that include at least about ten weight percent of $SiO_2$ and/or an $SiO_2$ derivative, based upon the total weight of the composition; all silicates; and any combination of any of these in any proportion. The phrase "reinforcement-grade carbon black", as used therein, includes any carbon black with an average particle size smaller than about 40 nm, which corresponds to an average surface area of about 65 $m^2$/g.

The elastomeric composition may then be formed into a cold-shrink article by any suitable process such as, for example, extrusion or molding. In some embodiments, the elastomeric composition of the cold-shrink article is cured, autoclaved, or irradiated, to affect physical properties of the elastomeric composition. Examples of suitable curing, autoclaving, and irradiating methods are described in detail in the above-noted U.S. patent application Ser. No. 11/191,838.

The elastomeric compositions of the present invention may be formed into cold-shrink articles of any shape or geometric configuration known in the art. Some non-exhaustive examples of cold-shrink articles include tubing, plaques, and multiple-branched structures (i.e., glove-like structures with multiple entrances and/or exits).

Cold-shrink articles of the present invention (formed from elastomeric compositions of the present invention) may exhibit various advantageous mechanical properties in various combinations under various environmental conditions (e.g., room temperature or 150° C.). In some embodiments, cold-shrink articles of the present invention such as tubing and plaques may exhibit an elongation at break of at least about 450% at room temperature and/or an elongation at break of at least about 250% at 150° C., when tested pursuant to the procedures of the Property Analysis and Characterization Procedure section of this document. Some embodiments of the cold-shrink articles of the present invention such as tubing and plaques may exhibit a percent permanent set of less than about 35% at 100° C., when tested pursuant to the procedures of the Property Analysis and Characterization Procedure section. Furthermore, some embodiments of tubing and plaques formed from compositions of the present invention may exhibit a percent permanent set of less than about 25% at 100° C. In some embodiments, plaques formed from compositions of the present invention may exhibit a percent permanent set of less than about 20% at 100° C.

Various embodiments of the cold-shrink articles of the present invention resist tearing or splitting at elevated temperatures. For example, some embodiments of the cold-shrink articles of the present invention resist tearing when maintained in an expanded state for an extended period of time (e.g., seven days in a 200% radially-expanded state) at an elevated temperature of about 150° C.

Various embodiments of the cold-shrink articles of the present invention exhibit chemical resistance to substances such as, for example, diesel fuel and hydraulic fluid. Some embodiments of the cold-shrink articles of the present invention exhibit a percent weight increase of less than about 25% when immersed in diesel fuel at about 49° C. for 24 hours and/or a percent weight increase of less than about 10% when immersed in hydraulic fluid at about 71° C. for 24 hours.

Embodiments can include, for example, a pressure restraining enclosure for cables. A first cable 12 can include a conductor and an oil-containing layer surrounding the conductor. A second cable 55 can include a conductor. A splice 50 can connect the conductor of the first cable 12 with the conductor of the second cable 55. A pressure restraining sleeve 60 can overly the splice 50 and the conductors of the first and second cable 55s. The pressure restraining sleeve 60 can include, for example, a number of interlaced strands, and can include, more particularly, a number of braided wires.

Several fasteners can be applied to several locations on the pressure restraining sleeve 60 to tighten the pressure restraining sleeve 60 around the splice 50 and portions of the first and second cable 55. A number of fasteners 66, 68 can be applied, for example, on the pressure restraining sleeve 60 at locations radially aligned with the end portions of the splice 50. A number of fasteners 62, 64 can also be applied, for example, on the pressure restraining sleeve 60 at locations away from the splice 50 on either side of the splice 50. The fasteners can include any structure capable of fastening, including, for example, clamp structures, turns or wraps of wire, tape materials, cable ties, cold shrink tubing, and other fasteners.

Embodiments can include an electrically insulative, substantially oil-impermeable, elastomeric tube 26 overlying a portion of the oil-containing layer of the first cable 12. Embodiments of the elastomeric tube 26, for example, can be positioned substantially near a terminal end of the first cable 12, where the conductor of the first cable 12 can include a partially exposed central conductor, where the oil-containing layer of the first cable 12 can include a partially exposed, oil-impregnated, electrically insulative paper layer surrounding the conductor. The first cable 12 can also include, for example, a partially exposed semiconducting layer surrounding the paper layer and a lead jacket surrounding the semiconducting layer, where the elastomeric tube 26 contacts and surrounds the exposed portions of the semiconducting and paper layers. At least one fastener 70, 72 can be applied on the pressure restraining sleeve 60 at a location radially aligned with a portion of the elastomeric tube 26. For example, fasteners 70, 72 can be applied on the pressure restraining sleeve 60 at locations radially aligned with end portions of the elastomeric tube 26.

The elastomeric tube 26 can be, for example, a composition including a fluoroelastomer and an epichlorohydrin. Embodiments of the elastomeric tube 26, for example, can include in the range of about 10 parts to about 60 parts fluoroelastomer per 100 parts of fluoroelastomer and epichlorohydrin. Embodiments of the elastomeric tube 26, for example, can include in the range of about 40 parts to about 90 parts epichlorohydrin per 100 total parts of fluoroelastomer and epichlorohydrin.

Alternative embodiments can include, for example, other pressure restraining enclosures for cables. A cable can include a singular main cable 12 branching out to form a series of first cables 153*a*, 153*b*, 153*c* each having a conductor and an oil-containing layer surrounding the conductor. A series of second cables 155*a*, 155*b*, 155*c* can each include a conductor. Several splices 50*a*, 50*b*, 50*c* can be included, where each of the splices 50*a*, 50*b*, 50*c* can connect a conductor of each cable from the series of first cables 153*a*, 153*b*, 153*c* with a conductor of each cable from the series of second cables 155*a*, 155*b*, 155*c*. An electrically insulative elastomeric boot 122 can overly a portion of the main cable 12 and a portion of the series of first cables 153*a*, 153*b*, 153*c*. The elastomeric boot 122 can include a glove-like body which has a singular opening at a first end of the glove-like body and several openings at a second end of the glove-like body, where the singular opening can receive the main cable 12, and where each of the openings can receive each cable of the series of first cables 153*a*, 153*b*, 153*c*. Alternative embodiments of the boot 122 can also be semiconductive.

The elastomeric boot 122 can be, for example, a composition including a fluoroelastomer and an epichlorohydrin. Embodiments of the elastomeric boot 122, for example, can include in the range of about 10 parts to about 60 parts fluoroelastomer per 100 parts of fluoroelastomer and epichlorohydrin. Embodiments of the elastomeric boot 122, for example, can include in the range of about 40 parts to about 90 parts epichlorohydrin per 100 total parts of fluoroelastomer and epichlorohydrin.

A pressure restraining body 157 can overly the main cable 12 and the elastomeric boot 122. The pressure restraining body 157 can have a singular opening at one end of the pressure restraining body 157 and several openings at the other end of the pressure restraining body 157, where the singular opening can receive the main cable 12, and where each of the openings can receive each cable of the series of first cables 153*a*, 153*b*, 153*c*. A plurality of pressure restraining sleeves 160*a*, 160*b*, 160*c* can be included, where each pressure restraining sleeve 160*a*, 160*b*, 160*c* can overly each splice 50*a*, 50*b*, 50*c* and the conductor of each cable of the series of first cables 153*a*, 153*b*, 153*c* and the conductor of each cable of the series of second cables 155*a*, 155*b*, 155*c*. The pressure restraining body 157 and each of the pressure restraining sleeves 160*a*, 160*b*, 160*c* can include, for example, a number of interlaced strands, and can include, more particularly, a number of braided wires.

Several fasteners can be applied to several locations on the pressure restraining body 157 and each of the pressure restraining sleeves 160*a*, 160*b*, 160*c* to tighten the pressure restraining body 157 around the elastomeric boot 122 and to tighten each of the pressure restraining sleeves 160*a*, 160*b*, 160*c* around each splice 50*a*, 50*b*, 50*c* and portions of each cable of the series of first cables 153*a*, 153*b*, 153*c* and series of second cables 155*a*, 155*b*, 155*c*. For example, at least one fastener 158 can be applied on the pressure restraining body 157 at a location radially aligned with a portion of the main cable 12. Also, for example, a number of fasteners 166*a*, 166*b*, 166*c*, 168*a*, 168*b*, 168*c* can be applied on each pressure restraining sleeve 160*a*, 160*b*, 160*c* at locations radially aligned with end portions of the splice 50*a*, 50*b*, 50*c*. Additionally, a number of fasteners 162, 164*a*, 164*b*, 164*c* can also be applied, for example, on each of the pressure restraining sleeves 160*a*, 160*b*, 160*c* at locations away from the splice 50 on either side of the splice 50. In this manner, for example, a single fastener 162 can be applied collectively around all pressure restraining sleeves 160*a*, 160*b*, 160*c* at a single location radially aligned with the main cable 12, and fasteners 164*a*, 164*b*, 164*c* can be applied individually around each of the pressure restraining sleeve 160*a*, 160*b*, 160*c* at the other end of each of the cable restraining sleeves 160*a*, 160*b*, 160*c*.

Embodiments can include a number of electrically insulative, substantially oil-impermeable, elastomeric tubes 26*a*, 26*b*, 26*c*. Each elastomeric tube 26*a*, 26*b*, 26*c*, for example, can overly a portion of the oil-containing layer of each cable of the series of first cables 153*a*, 153*b*, 153*c*. Also, for example, each elastomeric tube 26*a*, 26*b*, 26*c* can be positioned substantially near a terminal end of each cable of the series of first cables 153*a*, 153*b*, 153*c*, where each conductor of each cable of the series of first cables 153*a*, 153*b*, 153*c* includes a partially exposed central conductor, and where each oil-containing layer of each cable of the series of first cables 153*a*, 153*b*, 153*c* includes a partially exposed, oil-impregnated, electrically insulative paper layer surrounding the conductor. Each cable of the series of first cables 153*a*, 153*b*, 153*c*, for example, can include a partially exposed semiconducting layer surrounding the paper layer and a lead jacket surrounding the semiconducting layer, where each elastomeric tube 26*a*, 26*b*, 26*c* contacts and surrounds the exposed portions of each of the semiconducting and paper layers. At least one fastener 170*a*, 170*b*, 170*c*, 172*a*, 172*b*, 172*c* can be applied on each pressure restraining sleeve 160*a*, 160*b*, 160*c* at a location radially aligned with a portion of the elastomeric tube 26*a*, 26*b*, 26*c*. For example, fasteners 170*a*, 170*b*, 170*c*, 172*a*, 172*b*, 172*c* can be applied on each pressure restraining sleeve 160*a*, 160*b*, 160*c* at locations radially aligned with end portions of the elastomeric tube 26*a*, 26*b*, 26*c*.

The elastomeric tube 26*a*, 26*b*, 26*c* can be, for example, a composition including a fluoroelastomer and an epichlorohydrin. Embodiments of the elastomeric tube 26*a*, 26*b*, 26*c*, for example, can include in the range of about 10 parts to about 60 parts fluoroelastomer per 100 parts of fluoroelastomer and epichlorohydrin. Embodiments of the elastomeric tube 26*a*, 26b, 26c, for example, can include in the range of about 40 parts to about 90 parts epichlorohydrin per 100 total parts of fluoroelastomer and epichlorohydrin.

Although the aforementioned detailed description contains many specific details for purposes of illustration, anyone of ordinary skill in the art will appreciate that many variations, changes, substitutions, and alterations to the details are within the scope of the invention as claimed. Accordingly, the invention described in the detailed description is set forth without imposing any limitations on the claimed invention. For example, any reference to terms such as mounted, connected, attached, joined, coupled, etc. should be construed broadly so as to include such mounting, connecting, attaching, joining, coupling, etc. as having been achieved indirectly, directly, and/or integrally. The proper scope of the invention should be determined by the following claims and their appropriate legal equivalents.

The invention claimed is:

1. An apparatus comprising:
   a first cable including a conductor and an oil-containing layer surrounding the conductor;
   a second cable including a conductor;
   a splice to connect the conductor of the first cable with the conductor of the second cable;
   a pressure restraining sleeve overlying the splice and the conductors of the first and second cables, wherein the pressure restraining sleeve comprises a plurality of interlaced strands;
   a plurality of fasteners applied to a plurality of locations on the pressure restraining sleeve to tighten the pressure restraining sleeve around the splice and portions of the first and second cable.

2. The apparatus of claim 1, wherein the plurality of interlaced strands comprise a plurality of braided wires.

3. The apparatus of claim 1, wherein the fasteners are selected from the group consisting of: clamp structures, turns of wire, tape materials, cable ties, and cold shrink tubing.

4. The apparatus of claim 1, wherein fasteners are applied on the pressure restraining sleeve at locations radially aligned with end portions of the splice.

5. The apparatus of claim 1, wherein fasteners are applied on the pressure restraining sleeve at locations away from the splice on either side of the splice.

6. The apparatus of claim 1, further comprising an electrically insulative, substantially oil-impermeable, elastomeric tube overlying a portion of the oil-containing layer of the first cable, wherein at least one fastener is applied on the pressure restraining sleeve at a location radially aligned with a portion of the elastomeric tube.

7. The apparatus of claim 6, wherein fasteners are applied on the pressure restraining sleeve at locations radially aligned with end portions of the elastomeric tube.

8. The apparatus of claim 6, wherein the elastomeric tube is positioned substantially near a terminal end of the first cable, wherein the conductor of the first cable comprises a partially exposed central conductor, wherein the oil-containing layer of the first cable comprises a partially exposed, oil-impregnated, electrically insulative paper layer surrounding the conductor, wherein the first cable further comprises a partially exposed semiconducting layer surrounding the paper layer and a lead jacket surrounding the semiconducting layer, and wherein the elastomeric tube contacts and surrounds the exposed portions of the semiconducting and paper layers.

9. The apparatus of claim 6, wherein the elastomeric tube comprises a composition including a fluoroelastomer and an epichlorohydrin.

10. The apparatus of claim 9, wherein the elastomeric tube comprises in the range of about 10 parts to about 60 parts of fluoroelastomer per 100 total parts of fluoroelastomer and epichlorohydrin, and wherein the elastomeric tube comprises in the range of about 40 parts to about 90 parts epichlorohydrin per 100 total parts of fluoroelastomer and epichlorohydrin.

11. An apparatus comprising:
    a cable comprising a singular main cable branching out to form a series of first cables each including a conductor and an oil-containing layer surrounding the conductor;
    a series of second cables each including a conductor;
    a plurality of splices, each splice connecting a conductor of each cable from the series of first cables with a conductor of each cable from the series of second cables;
    an electrically insulative elastomeric boot overlying a portion of the main cable and a portion of the series of first cables, wherein the elastomeric boot comprises a glove-like body including a singular opening at a first end of the glove-like body and a plurality of openings at a second end of the glove-like body, the singular opening receiving the main cable, and each of the plurality of openings receiving each cable of the series of first cables;
    a pressure restraining body overlying the main cable and the elastomeric boot, the pressure restraining body having a singular opening at one end of the pressure restraining body and a plurality of openings at the other end of the pressure restraining body, the singular opening receiving the main cable, and each of the plurality of openings receiving each cable of the series of first cables;
    a plurality of pressure restraining sleeves, each pressure restraining sleeve overlying each splice and the conductor of each cable of the series of first cables and the conductor of each cable of the series of second cables;
    wherein the pressure restraining body and each of the pressure restraining sleeves comprises a plurality of interlaced strands; and
    a plurality of fasteners applied to a plurality of locations on the pressure restraining body and each of the pressure restraining sleeves to tighten the pressure restraining body around the elastomeric boot and to tighten each of the pressure restraining sleeves around each splice and portions of each cable of the series of first cables and series of second cables.

12. The apparatus of claim 11, wherein the plurality of interlaced strands comprise a plurality of braided wires.

13. The apparatus of claim 11, wherein the fasteners are selected from the group consisting of: clamp structures, turns of wire, tape materials, cable ties, and cold shrink tubing.

14. The apparatus of claim 11, wherein at least one fastener is applied on the pressure restraining body at a location radially aligned with a portion of the main cable.

15. The apparatus of claim 11, wherein fasteners are applied on each pressure restraining sleeve at locations radially aligned with end portions of the splice.

16. The apparatus of claim 11, further comprising a plurality of electrically insulative, substantially oil-impermeable, elastomeric tubes, each elastomeric tube overlying a portion of the oil-containing layer of each cable of the series of first cables, wherein at least one fastener is applied on each pressure restraining sleeve at a location radially aligned with a portion of the elastomeric tube.

17. The apparatus of claim 16, wherein fasteners are applied on each pressure restraining sleeve at locations radially aligned with end portions of the elastomeric tube.

18. The apparatus of claim 16, wherein the elastomeric boot overlies a portion of the elastomeric tube.

19. The apparatus of claim 16, wherein each elastomeric tube is positioned substantially near a terminal end of each cable of the series of first cables, wherein each conductor of each cable of the series of first cables comprises a partially exposed central conductor, wherein each oil-containing layer of each cable of the series of first cables comprises a partially exposed, oil-impregnated, electrically insulative paper layer surrounding the conductor, wherein each cable of the series of first cables further comprises a partially exposed semiconducting layer surrounding the paper layer and a lead jacket surrounding the semiconducting layer, and wherein each elastomeric tube contacts and surrounds the exposed portions of each of the semiconducting and paper layers.

20. The apparatus of claim 16, wherein each elastomeric tube comprises a composition including a fluoroelastomer and an epichlorohydrin.

21. The apparatus of claim 20, wherein the elastomeric tube comprises in the range of about 10 parts to about 60 parts of fluoroelastomer per 100 total parts of fluoroelastomer and epichlorohydrin, and wherein the elastomeric tube comprises in the range of about 40 parts to about 90 parts epichlorohydrin per 100 total parts of fluoroelastomer and epichlorohydrin.

22. The apparatus of claim 11, wherein the elastomeric boot comprises a composition including a fluoroelastomer and an epichlorohydrin.

23. The apparatus of claim 22, wherein the elastomeric boot comprises in the range of about 10 parts to about 60 parts of fluoroelastomer per 100 total parts of fluoroelastomer and epichlorohydrin, and wherein the elastomeric boot comprises in the range of about 40 parts to about 90 parts epichlorohydrin per 100 total parts of fluoroelastomer and epichlorohydrin.

* * * * *